United States Patent

Dillon

[11] Patent Number: 5,890,733
[45] Date of Patent: Apr. 6, 1999

[54] HOOK AND SNAP SIDE AIR BAG MODULE ATTACHMENT

[75] Inventor: Michael R. Dillon, Holly, Mich.

[73] Assignee: AlliedSignal Inc., Morristown, N.J.

[21] Appl. No.: 738,963

[22] Filed: Oct. 24, 1996

[51] Int. Cl.⁶ .................................................. B60R 21/22
[52] U.S. Cl. ..................................... 280/730.2; 280/728.2
[58] Field of Search ............................ 280/728.2, 730.1, 280/730.2

[56] References Cited

U.S. PATENT DOCUMENTS

| | | | |
|---|---|---|---|
| 3,842,709 | 10/1974 | Fuqua. | |
| 4,083,162 | 4/1978 | Regal et al. | 411/508 X |
| 4,512,699 | 4/1985 | Jackson et al. | 411/368 |
| 5,333,897 | 8/1994 | Landis et al. | 280/728.2 |
| 5,542,691 | 8/1996 | Marjanski et al. | 280/728.2 |
| 5,547,214 | 8/1996 | Zimmerman, II et al. | 280/730.2 |
| 5,556,125 | 9/1996 | Ricks et al. | 411/509 X |
| 5,556,127 | 9/1996 | Hurford et al. | 280/730.2 |
| 5,556,129 | 9/1996 | Coman et al. | 280/730.2 |
| 5,568,936 | 10/1996 | Spilker et al. | 280/728.2 |
| 5,667,241 | 9/1997 | Bunker et al. | 280/730.2 |

FOREIGN PATENT DOCUMENTS

| | | |
|---|---|---|
| 315184 A | 5/1989 | European Pat. Off. . |
| 769429 A | 4/1997 | European Pat. Off. . |
| 9402753 U | 4/1994 | Germany . |

*Primary Examiner*—Kenneth R. Rice
*Attorney, Agent, or Firm*—Markell Seitzman

[57] ABSTRACT

A side impact system adapted to be mounted upon a support member or pillar (26) of an upholstered vehicle seat (30), the frame including a mounting opening (27) comprising: a bracket (40) having a front face (42) and sides (44a,b), a socket (46) for receiving a snap fastener and receptacle (48) for receiving a tab (80), the receptacle having an open face (49) through which the tab (80) is inserted and a projection (52) extending outward from the front face; a generally rectangular housing (70) having a bottom (72), opposing sides (74a,b) extending from the bottom and ends (76a,b) extending from the bottom and joined to the sides, the bottom (72) including at least one fastener opening (78) and one of the ends (76a), wherein the tab (80) extends outwardly from the top of the housing (70); with the housing received upon the bracket (40) and with the tab (80) within the receptacle (48) and the mounting opening, the socket and the fastener opening (78) are in alignment.

15 Claims, 5 Drawing Sheets

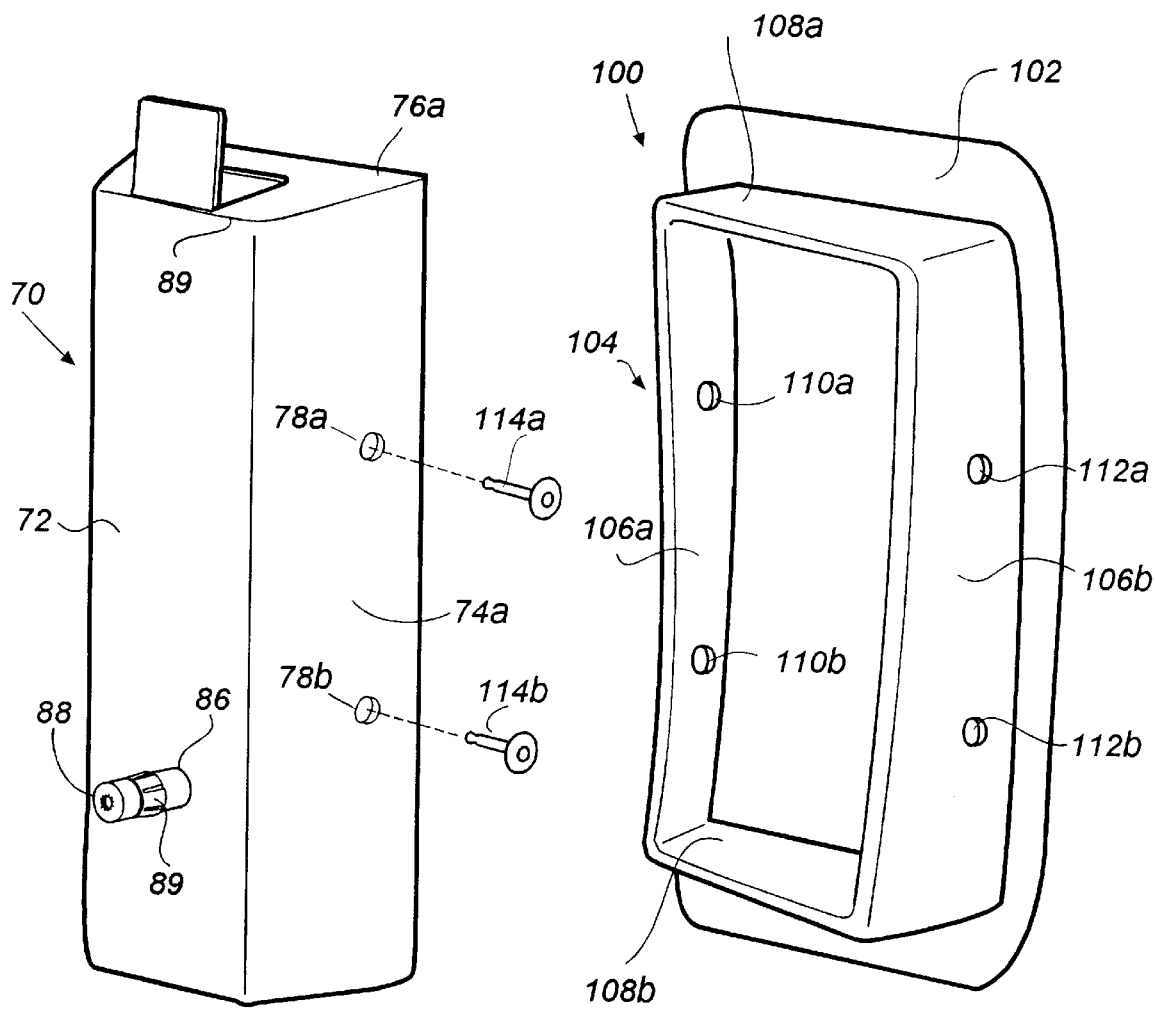

HOOK AND SNAP SIDE AIR BAG MODULE ATTACHMENT

BACKGROUND AND SUMMARY OF THE INVENTION

The present invention generally relates to air bag modules and a means for attachment and more specifically to a side impact air bag module which will protect an occupant when the side of the vehicle is involved in an accident.

It is an object of the present invention to provide an air bag module that is easily assembled to a frame of a vehicle seat or other support structure of a vehicle. A further object of the present invention is to provide an air bag module that is attached to a frame using a minimum number of discrete fasteners.

A vehicle seat is typically constructed with a foam padding about its frame. This padding is provided with a cut-out or window through which the air bag module housing is received and attached to the frame. Some installations require the padding to be disrupted or moved out of the way to expose a mounting flange of the housing and to also provide sufficient room or clearance to receive a powered tool which is used to drive a thread bolt through the flange to secure the housing to the frame.

It is a further object of this invention to provide a module that can easily be attached to a seat frame requiring minimum disruption to the foam padding of the seat.

Accordingly the invention comprises: a side impact system adapted to be mounted upon a support member or frame of an upholstered vehicle seat, the frame including a mounting opening comprising: a bracket having a front face and sides, a socket for receiving a snap fastener, a receptacle for receiving a tab, the receptacle having an open face through which the tab is inserted and a projection extending above the front face; a generally rectangular housing having a bottom, opposing sides extending from the bottom and ends extending from the bottom and joined to the sides, the bottom including at least one fastener opening wherein the tab extends outwardly from one end of the housing. With the housing received upon the bracket and with the tab within the receptacle, the mounting opening, the socket and the fastener opening are in alignment.

Many other objects and purposes of the invention will be clear from the following detailed description of the drawings.

BRIEF DESCRIPTION OF THE DRAWINGS

In the drawings:

FIGS. 3 and 4 show various views of a housing.

FIGS. 5 and 6 show views of a cover.

DETAILED DESCRIPTION OF THE DRAWINGS

Figure 1:
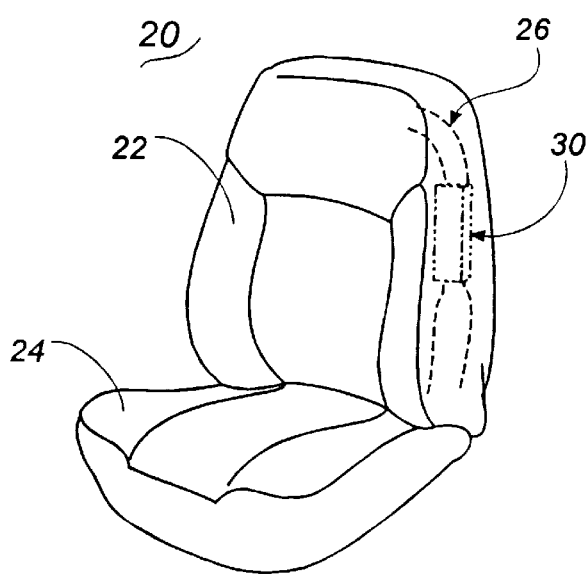
FIG. 1 illustrates the location of a side impact air bag module integrated with the back of a typical automotive seat.
Figure 2:
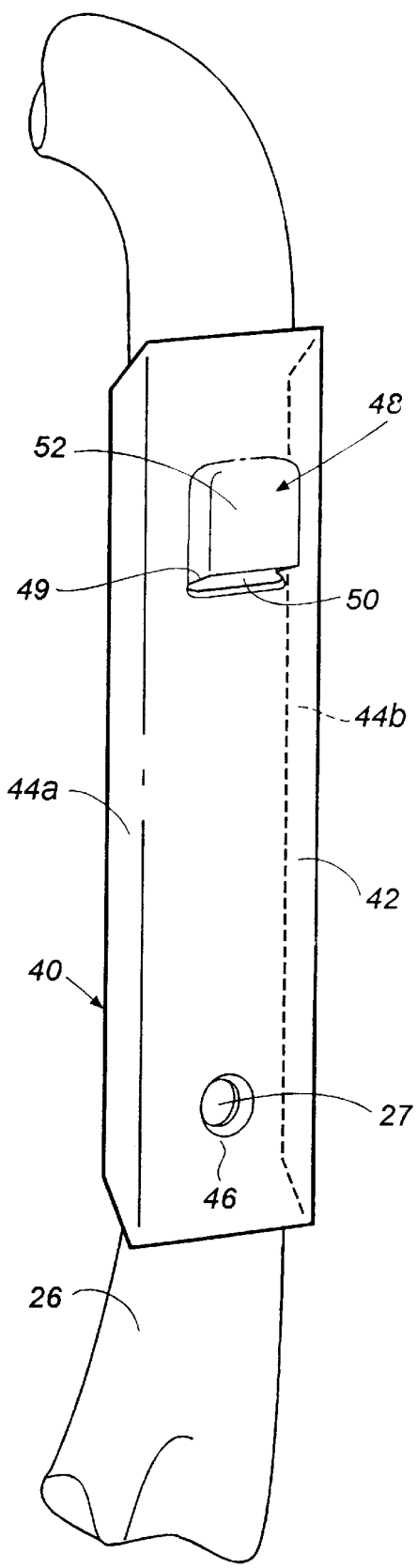
FIG. 2 is a partial sectional view of a portion of a seat frame with a bracket attached thereto.

FIG. 1 illustrates a vehicle-seat 20 having an upholstered back 22 and cushion 24. As is known in the art, the seat includes a support structure or frame 26 within the back and the cushion. Frame 26 (also partially shown in FIG. 2) is typical of frames used within typical automotive seats which are often made from steel tubing having a circular, oval or generally rectangular cross-section. Diagrammatically shown attached to the frame 26 is an air bag module 30 shown in detail below. The module comprises an optional mounting bracket 40, housing 70, inflator 122, air bag 124 and cover 100. When activated, the air bag will deploy between the side of the occupant and the side of the vehicle.

Figure 3:
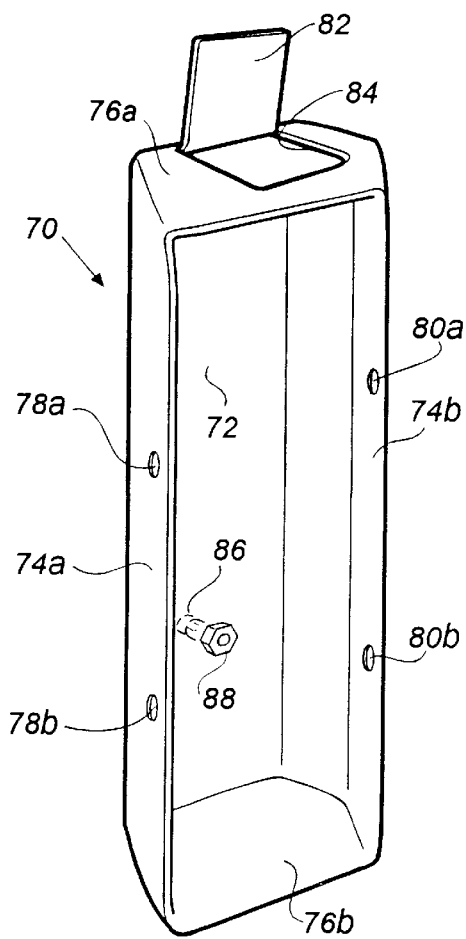

Reference is made to FIGS. 3 and 4 which illustrate front and rear projected views of a housing 70. The housing is preferably made of steel or aluminum and includes a bottom 72 with opposing sides 74a and 74b extending therefrom and opposing ends 76a and 76b. Side 74a includes openings 78a and 78b while side 74b includes openings 80a and 80b. End 76a includes a spring tab or hook 82 formed from a bent-over portion of end 76a which is severed about an opening or slit 84. It will be apparent from the description below that the spring tab, rather than being formed as an integral portion of the end 76a, can be provided by a separate attachment member secured thereto. The housing 70 further includes an opening 86 in its bottom through which a fastener 88 such as a known snap fastener can be inserted. One such snap fastener is made by Avibank Mgr. Inc. Snap fasteners such as the one illustrated in FIG. 4 include a head 85, which is fixedly secured to the housing bottom 72, and a plurality of forwardly extending spring fingers 89 formed as a side of a cup. This arrangement permits the spring fingers to be inserted and secured within a socket opening 46 (formed on the bracket 40 or formed directly in the seat frame 26). Once seated within this socket opening the fingers spring outwardly preventing withdrawal of the fastener.

Figure 5:
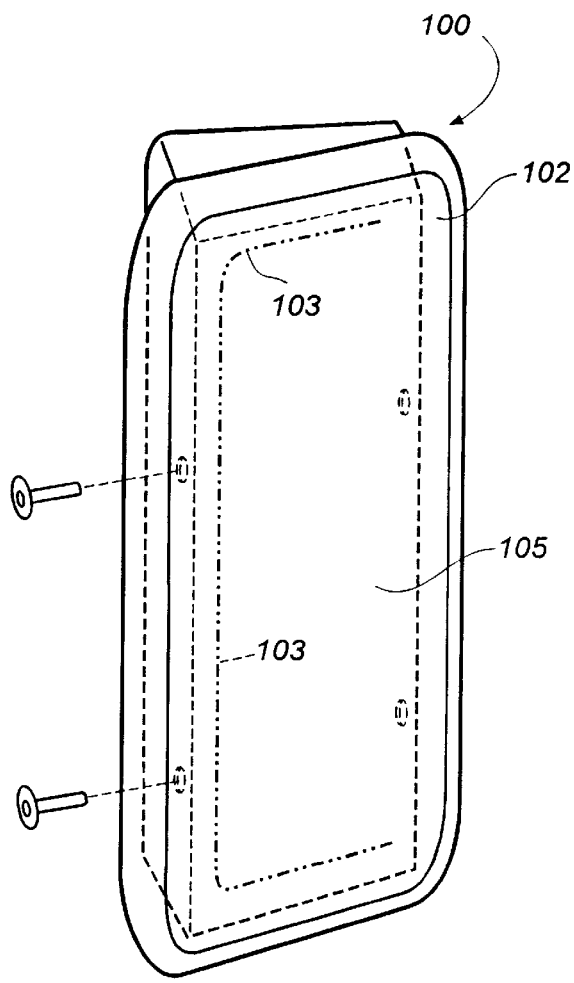

Reference is made to FIGS. 5 and 6 which show front and rear views of a cover generally shown as 100. The cover 100 is preferably made of an elastic material. The cover includes a top or lid 102 which also has formed thereon a tear seam 103. That portion 105 of the lid 102 generally opposite the tear seam portion 103a acts as a hinge to permit the cover material within the tear seam area to pivot after the tear seam is opened in response to the expanding air bag. Extending from the underside of the cover is an open, box-like member 104 having sides 106a, 106b and ends 108a and 108b. Side 106a includes openings 110a and 110b while side 106b includes openings 112a and 112b. The inner dimensions between the opposing sides 106a,b and the opposing ends 108a,b are sized to permit the member 104 to be slipped over the sides and ends of the housing 70. When the cover is in place, a plurality of fasteners 114a,b, such as rivets, are received through openings 112a,b of the cover 110 and through openings 78a,b to fasten one side of the cover in place.

Figure 7:
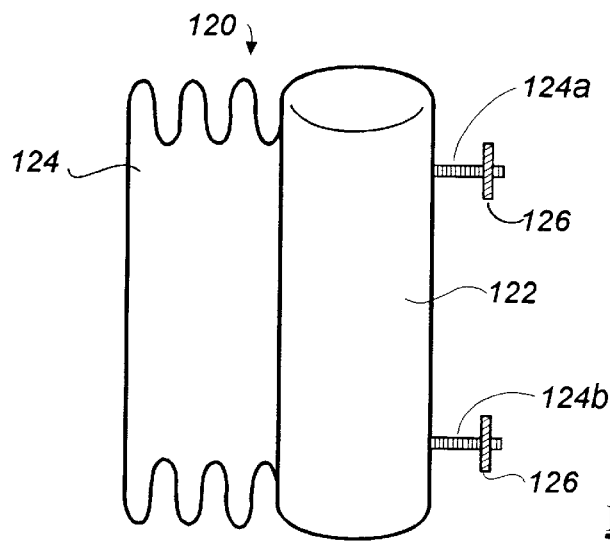
FIG. 7 diagrammatically illustrates an inflator/air bag assembly.

Prior to attaching the cover 100 to the housing 70, an inflator/air bag assembly generally shown as 120 (see FIG. 7) is attached to the housing 70. The assembly 120 may include a cylindrically shaped inflator generally shown as 122 with an air bag 124 positioned about the inflator to receive inflation gas which is generated in response to an activation signal. A plurality of fasteners such as threaded bolts 124a and 124b are inserted through openings 80a and 80b of the housing. Thereafter the cover 100 is positioned adjacent the housing 70 such that the extending ends of the fasteners 124a and 124b extend through the openings 110a and 10b of the cover. The inflator assembly 120, housing 70 and cover 100 may be secured together by hex nuts such as 126 which are shown attached to the threaded fasteners 124a,b (in FIG. 7).

Figure 8:
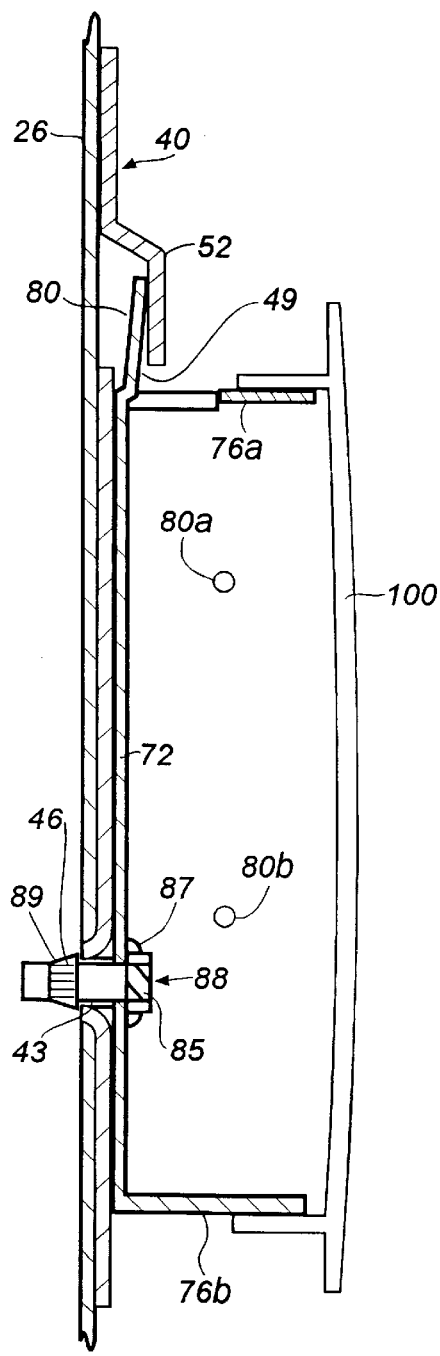
FIG. 8 is a cross-sectional view of the present invention.

Reference is again made to FIG. 2 which illustrates a portion of the seat frame 26. Positioned on the frame 26 is a bracket 40. The bracket 40 includes a front surface 42 and sides 44a and 44b extending therefrom. A socket opening 46 is formed in the front surface 42. Portions 43 (see FIG. 8) of the front surface extend rearwardly forming a retaining ring to receive the ends of the spring fingers 89 of the snap fastener 88. The bracket 40 is secured to the frame such as by welding with the opening 86 in alignment with an opening 27 within the frame. The bracket 40 is also preferably aligned on the seat frame to provide an optimum deployment angle for occupant protection based on static and dynamic testing such as generally parallel or perpendicular to the seat frame. In the embodiment shown the bracket 40 is generally perpendicular to the seat frame. It should be apparent that while the preferred embodiment of the invention illustrates the module 30 positioned to a seat frame 26, the B-pillar, interior door frame or other support member within the vehicle could be used in conjunction with the present invention. The bracket 40 additionally includes an open-faced receptacle, slit or retaining opening generally shown as 48 formed by slitting the front surface at 50 and forming an outwardly extending projection 52. Alternatively, this receptacle could be attached as a separate piece to the bracket. The open face of the receptacle 48 is shown as 49. The module 30 is assembled as follows. The snap fit connector 88 is inserted into the bottom 72 of the housing. Thereafter, the inflator/air bag assembly 120 is fitted to the side 74b and the cover 100 attached to the housing. The housing is positioned upon the bracket 40 with the spring tab 80 inserted within the receptacle 48. The inner dimensions of the receptacle 48 and the width of the hook 80 are chosen to prevent the housing 70 from moving laterally. This is achieved by a friction fit between the receptacle 48 and the tab or hook 80. With the hook or tab 80 within the socket, the housing 70 is rotated about its rear corner 89 permitting the bottom 72 to lay flat against surface 42. As the bottom 72 is brought into contact with surface 42, the snap fit connector enters the aligned openings 46 and 27 and snaps therein securing the housing 70 to the bracket 40. As can be appreciated, the rotation of the housing about corner 89 further bends the spring hook 80 providing an additional resilient force between the receptacle 48 and the hook to maintain the upper portion of the housing 70 in place.

Figure 9:
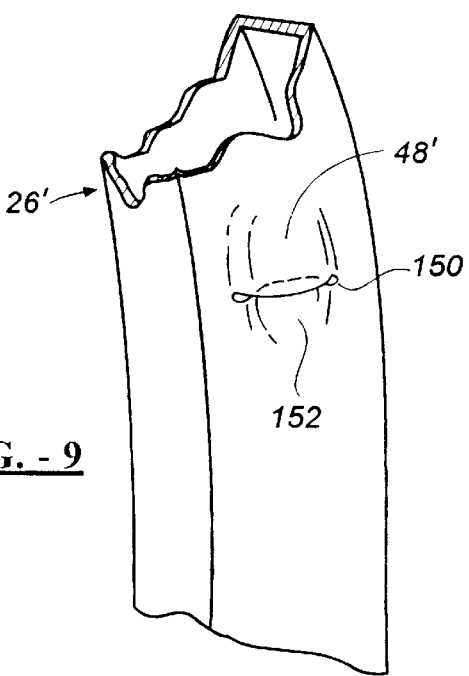
FIGS. 9 and 10 show a further embodiment of the invention.
Figure 10:
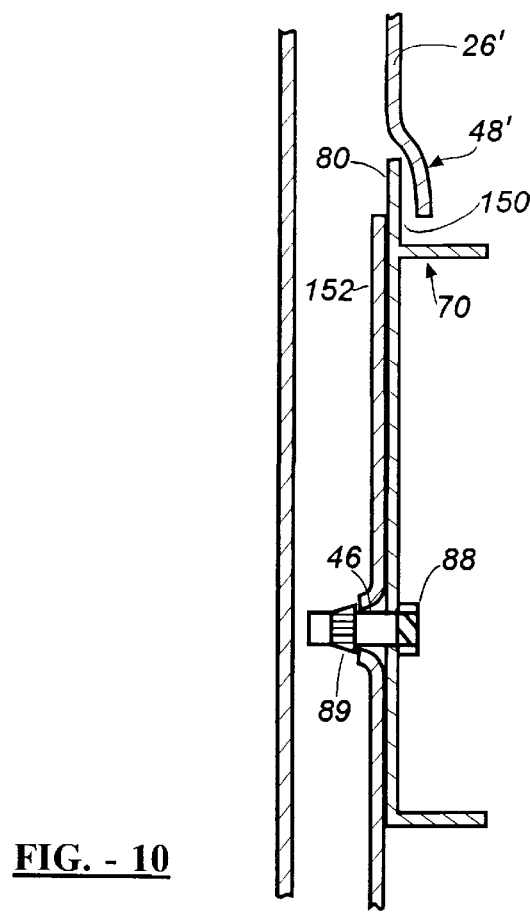

It should be appreciated from the above that the bracket 40 is optional in that the open-faced receptacle 48' can be formed directly on the frame 26 which may be formed by providing a rectangular slit 150 within a rectangular, hollow tubular frame 26' and depressing a portion of the frame 152 just below the slit 48 as illustrated in FIGS. 9 and 10.

Figure 11:
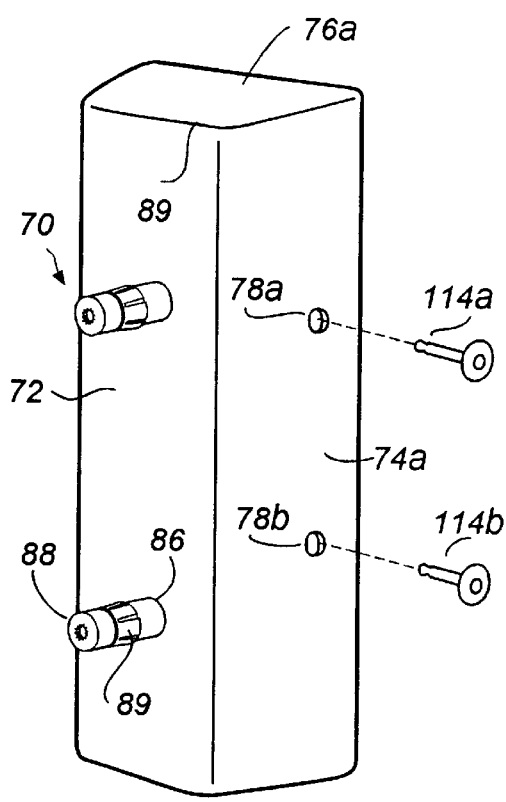
FIGS. 11 and 12 show an additional embodiment of the invention.
Figure 12:
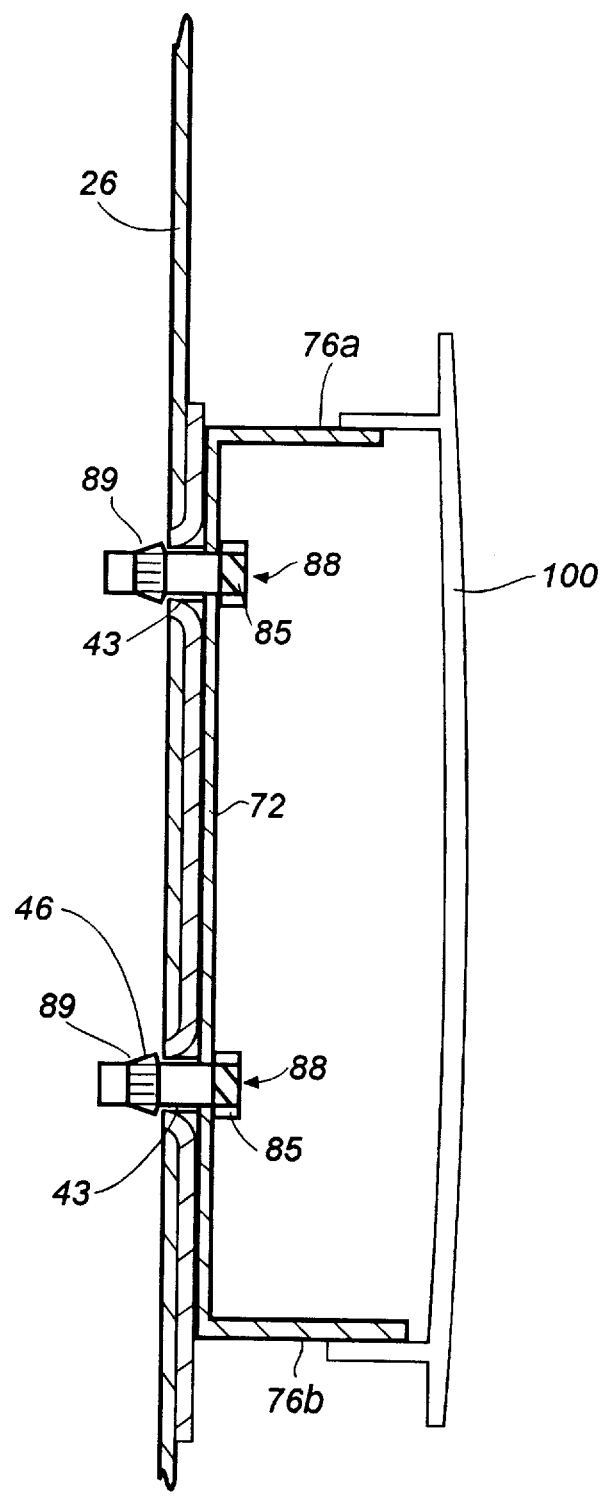

Reference is briefly made to FIGS. 11 and 12 which show a further alternate embodiment of the invention. FIG. 11 is a rear projected view of a housing 70'. Housing 70' is substantially identical to housing 70 with the exception that it does not include the tab 80. The housing 70' includes a second mounting opening 86' near the top to receive a second snap fastener 88a. FIG. 12 is a cross-sectional view of a modified bracket 40' having a second socket opening 46' to receive the second snap fastener 88'.

Many changes and modifications in the above described embodiment of the invention can, of course, be carried out without departing from the scope thereof. Accordingly, that scope is intended to be limited only by the scope of the appended claims.

I claim:

1. A side impact air bag restraint system adapted to be mounted upon a support member or frame (26) of a vehicle comprising:

an air bag module (30) including a housing (70, 70') having a surface (72);

fastening means for mounting the housing in a generally vertical orientation to the frame (26) and for preventing rotation of the housing including a first fastener (80) for mounting a top portion of the housing and a second fastener (88) spaced from the first fastener received through the first surface;

wherein the first fastener includes a spring hook or tab (80) extending from a top end (76a) of the housing (70) and adapted to be tightly received within a mounting receptacle (48).

2. The device as defined in claim 1 wherein the spring tab (80) is integrally formed as a bent-over part of the top end (76a).

3. The device as defined in claim 1 wherein the first fastener is a snap fastener.

4. A side impact air bag restraint system adapted to be mounted upon a support member or frame (26) of a vehicle comprising:

an air bag module (30) including a generally rectangular housing (70, 70') having a surface (72);

fastening means for mounting the housing to the frame (26) and for preventing rotation of the housing including a first fastener (80) for mounting a top portion of the housing and a second fastener (88) spaced from the first fastener received through the surface;

wherein the second fastener is a snap fastener (88).

5. The device as defined in claim 4 wherein the mounting receptacle is formed on one of a mounting bracket (40) and the frame (26).

6. The device as defined in claim 5 wherein the bracket (40) includes a front face (42) and rearwardly facing sides (44a,b), a socket (46) for receiving the second fastener and a receptacle (48) for slidingly receiving the tab (80), the retainer opening having an open face (49) formed by providing a slit (50) in the front face (42) and forming a projection (52) extending outwardly from the front face.

7. The device as defined in claim 4 wherein the module (30) further includes an inflator (122) mounted within the housing (70,70') for filling an air bag (124) mounted close to the inflator (122) and a cover (100) protecting the air bag .

8. The device as defined in claim 4 wherein the first fastener includes a spring hook or tab (80) extending from a top end (76a) of the housing (70) and adapted to be tightly received within a mounting receptacle (48).

9. The device as defined in claim 4 wherein the mounting receptacle is formed on one of a mounting bracket (40) and the frame (26).

10. The device as defined in claim 4 wherein the module (30) further includes an inflator (122) mounted within the housing (70,70') for filling an air bag (124) mounted close to the inflator (122) and a cover (100) to protect the air bag.

11. A side impact system adapted to be mounted upon a support member or frame (26), the frame including a mounting opening (27) comprising:

bracket (40) having a front face (42) and sides (44a,b), a socket (46) for receiving a snap fastener and receptacle (48) for receiving a tab (80), the receptacle having an open face (49) through which the tab (80) is inserted and a projection (52) extending outwardly from the front face;

a housing (70) having a surface (72), opposing sides (74a,b) extending from the surface and ends (76a,b) extending from the surface and joined to the sides, the surface (72) including at least one fastener opening (78)

and one of the ends (76a), wherein the tab (80) extends outwardly from the top of the housing (70);

with the housing received upon the bracket (40) and with the tab (80) within the receptacle (48) and the mounting opening, the retaining opening and the fastener opening (78) are in alignment.

12. A side impact air bag restraint system adapted to be mounted upon a support member or frame (26) of a vehicle comprising:

an air bag module (30) including a housing (70, 70') having a surface (72);

fastening means for mounting the housing to the frame (26) and for preventing rotation of the housing including a first fastener (80) for mounting a top portion of the housing and a second fastener (88) spaced from the first fastener received through the surface; wherein the first fastener includes a spring hook or tab (80) extending from one end (76a) of the housing (70) and adapted to be tightly received within a mounting receptacle (48);

wherein the second fastener is a snap fastener (88).

13. The device as defined in claim 12 wherein the spring tab (80) is integrally formed as a bent-over part of the end (76a).

14. The device as defined in claim 12 wherein the mounting receptacle is formed on one of a mounting bracket (40) and the frame (26).

15. The device as defined in claim 12 wherein the module (30) further includes an inflator (122) mounted within the housing (70,70') for filling an air bag (124) mounted close to the inflator (122) and a cover (100) to protect the air bag.

* * * * *